United States Patent
Preston et al.

(10) Patent No.: US 10,114,131 B1
(45) Date of Patent: Oct. 30, 2018

(54) SCINTILLATOR BASED FIBER OPTIC PLATE FOR NEUTRON IMAGING APPLICATIONS AND THE LIKE

(71) Applicant: Consolidated Nuclear Security, LLC, Oak Ridge, TN (US)

(72) Inventors: Jeffrey R. Preston, Knoxville, TN (US); Ashley C. Stowe, Knoxville, TN (US); Brenden W. Wiggins, Los Alamos, NM (US)

(73) Assignee: Consolidated Nuclear Security, LLC, Oak Ridge, TN (US)

(*) Notice: Subject to any disclaimer, the term of this patent is extended or adjusted under 35 U.S.C. 154(b) by 0 days.

(21) Appl. No.: 15/862,996

(22) Filed: Jan. 5, 2018

(51) Int. Cl.
*G01T 3/06* (2006.01)
*G01T 1/20* (2006.01)

(52) U.S. Cl.
CPC .............. *G01T 3/06* (2013.01); *G01T 1/2002* (2013.01)

(58) Field of Classification Search
CPC ....... G01T 3/06; G01T 1/2006; G01T 1/2008; G01T 1/201; G01T 1/20; G01T 3/08
See application file for complete search history.

(56) References Cited

U.S. PATENT DOCUMENTS

| | | | |
|---|---|---|---|
| 9,158,008 | B2 | 10/2015 | Boatner et al. |
| 9,334,581 | B2 | 5/2016 | Stowe et al. |
| 9,658,343 | B2 | 5/2017 | Arodzero et al. |

OTHER PUBLICATIONS

Hamamatsu. "Fiber Optic Plates." https://www.hamamatsu.com/resources/pdf/etd/FOP_TMCP1040E.pdf May 2013.
Herrera E., Hamm D., Wiggins B., Milburn R., Burger A., Bilheux H.Z., Santodonato L., Chvala O., Stowe A.C., Lukosi E., LISe pixel detector for neutron imaging Nuclear Instruments and Methods in Physics Research Section A, 833, 142-148 (2016).
Lukosi E., Herrera E., Hamm D., Lee K.M., Wiggins B., Trtik P., Penumadu D., Young S., Santodonato L., Bilheux H. Z., Burger A., Matei L., Stowe A.C., Lithium indium diselenide: A new scintillator for neutron imaging Nuclear Instruments and Methods in Physics Research Section A, 830, 140-149 (2016).
Lukosi E., Herrera E., Hamm D., Stowe A.C., Wiggins B., Burger A., Lee K.M., Santodonato L., Bilheux H.Z., 6LiInSe2 Scintillators for Neutron Radiography SCINT 2015, 13th International Conference on Inorganic Scintillators and Their Applications, (2015).

(Continued)

*Primary Examiner* — David Porta
*Assistant Examiner* — Faye Boosalis
(74) *Attorney, Agent, or Firm* — Clements Bernard Walker PLLC; Christopher L. Bernard

(57) ABSTRACT

A chalcopyrite, colquiriite, neutron absorber loaded glass, or plastic scintillator based fiber optic plate for use in a neutron imaging system, including: a plurality of optical fiber segments disposed side-by-side adjacent to one another in a parallel array; and a binder material disposed between and coupling the plurality of optical fiber segments together. A diffuse reflective material is optically coupled to the plurality of first ends of the plurality of optical fiber segments. An optical detector device is optically coupled to the plurality of second ends of the plurality of optical fiber segments opposite the diffuse reflective material. Optionally, the fiber optic plate further includes a diffuse reflective material disposed one or more of on an exterior surface of each of the plurality of optical fiber segments and between the plurality of optical fiber segments.

27 Claims, 4 Drawing Sheets

(56) References Cited

OTHER PUBLICATIONS

Shi, Patrick Chee Wai. Single crystal fibres and their applications. University of Glasgow. http://these.gla.ac.uk/6741/. Jul. 2006.
Swift, A. L. "Materials and Configuration from NMIS Type Neutron Imaging and Gamma Spectroscopy." University of Tennessee. 2012.
Varex Imaging. "Medical Flat Panel Detectors." Accessed May 14, 2017. https://www.vareximaging.com/products/medical-flat-panel-detectors?cat=products.
Wang C. L., et al. "Wavelength-Shifting-Fiber Scintillation Detectors for Thermal Neutron Imaging at SNS." 2011 IEEE Nuclear Science Symposium Conference Record. HE4-3. 2011.

SCINTILLATOR BASED FIBER OPTIC PLATE FOR NEUTRON IMAGING APPLICATIONS AND THE LIKE

STATEMENT REGARDING FEDERALLY SPONSORED RESEARCH AND/OR DEVELOPMENT

The U.S. Government has certain rights to the present disclosure pursuant to Contract No. DE-NA0001942 between the U.S. Department of Energy and Consolidated Nuclear Security, LLC.

FIELD OF THE DISCLOSURE

The present disclosure relates generally to neutron imaging applications and the like. More specifically, the present disclosure relates to a chalcopyrite, colquiriite, neutron absorber loaded glass, or plastic scintillator based fiber optic plate (FOP) for neutron imaging applications and the like.

BACKGROUND OF THE DISCLOSURE

The current state-of-the-art in medical X-ray and low energy gamma imaging applications, for example, is vapor grown, columnar CsI(Tl) coupled to a conventional charge coupled device (CCD) array. There is, however, no complementary system for neutron imaging applications and the like outside of high energy physics. Although LiF—ZnS (Cu) sheets coupled to complementary metal oxide semiconductor (CMOS) panels have been used for both fast and thermal neutron imaging applications, providing high spatial resolution, they have limited efficiency due to thickness related light loss and provide slow signal development. Similarly, thick GS20 glass detectors have been used, but provide low light output on the order of single to tens of photons and limited spatial resolution due to broadening as light traverses from the point of interaction to the readout mechanism. Thin B-10 doped multichannel plates (MCPs) have also been used, but have limited efficiency. Thus, what is still needed in the art is an improved system for neutron imaging applications and the like.

BRIEF SUMMARY OF THE DISCLOSURE

In various exemplary embodiments, the present disclosure provides a chalcopyrite, colquiriite, neutron absorber loaded glass, or plastic scintillator based FOP for neutron imaging applications and the like. LiInSe2 may be used, for example. Fluoride and oxide scintillating compounds containing a neutron sensitive material (e.g., Li6 or B10) may also be used, for example. LiInSe2 is a neutron detecting material that exhibits both semiconductor and scintillator properties. LiInSe2 may be grown using a vertical Bridgman single crystal method or the like, providing a large detector exhibiting charge and/or light sharing properties that result in a low spatial resolution limit. For high resolution neutron imagery, a single crystal scintillator requires either fine pixilation of a directly coupled CCD or Si photomultiplier (SiPM) array or a sophisticated set of imaging optics to transmit scintillation light from the single crystal scintillator through a lens to a remote CCD array. Semiconducting variants are limited by the fundamentals of photolithography, and more succinctly by the pixel size of the application-specific integrated circuit (ASIC) readout. In either case, LiInSe2 has been demonstrated to provide 50 μm resolution with <2 cm2 of detector area, overcoming the detector spatial area problems inhibiting the creation of a low cost, commercially viable neutron imaging plate. LiInSe2 has also been demonstrated to provide >82% thermal neutron efficiency with 6Li, >1% fast neutron efficiency with 5 mm thickness, fast signal readout (31 ns and 143 ns), superior light output as compared to GS20 glass, and selective wavelength transparency. Thus, LiInSe2 may be used in both direct and mirrored imaging setups, utilizing the current state-of-the-art in CCD readouts common to the medical industry, for example.

The LiInSe2 utilized in the present disclosure is grown using a micro-pulling-down (μ-PD) technique or other standard technique for producing optical fiber, well known to those of ordinary skill in the art. This produces elongate strands of optical fiber that are then cut and arranged in parallel in a closely packed array, with an epoxy adhesive binder or the like disposed between the optical fiber segments. The front and back surfaces of the resulting plate are then planed and polished to facilitate coupling to a CCD array and opposed reflector, for example. This provides a chalcopyrite imaging detector panel that responds well to both thermal and fast neutrons, depending on the thickness of the imaging detector panel. Optionally, each of the optical fiber segments is "cladded" or coated with or otherwise surrounded by a diffuse reflector material, such as PTFE, that enhances the "waveguide" behavior of each of the optical fiber segments. Such "cladding" concept is well known to those of ordinary skill in the art.

In one exemplary embodiment, the present disclosure provides a chalcopyrite, colquiriite, neutron absorber loaded glass, or plastic scintillator based fiber optic plate for use in a neutron imaging system, including: a plurality of optical fiber segments disposed side-by-side adjacent to one another in a parallel array; and a binder material disposed between and coupling the plurality of optical fiber segments together. A plurality of first ends of the plurality of optical fiber segments and binder material form a first optical surface. A plurality of second ends of the plurality of optical fiber segments and binder material form a second optical surface opposite the first optical surface. As used herein, "opposite" simply means "at the other end of" one or more optical fiber(s) or optical fiber segment(s). A diffuse reflective material is optically coupled to the plurality of first ends of the plurality of optical fiber segments. An optical detector device is optically coupled to the plurality of second ends of the plurality of optical fiber segments opposite the diffuse reflective material. The fiber optic plate also includes a housing disposed about one or more of the parallel array and the binder material, the diffuse reflective material, and the optical detector device. Optionally, the fiber optic plate further includes a diffuse reflective material disposed one or more of on an exterior surface of each of the plurality of optical fiber segments and between the plurality of optical fiber segments. Each of the plurality of optical fiber segments is derived from one or more elongate optical fibers manufactured using a micro-pulling-down technique. Each of the plurality of optical fiber segments includes one or more of LiInSe2, LiInS2, LiCaF, a neutron absorber loaded glass, polystyrene, polyvinyl toluene, or the like.

In another exemplary embodiment, the present disclosure provides a method for manufacturing a chalcopyrite, colquiriite, neutron absorber loaded glass, or plastic scintillator based fiber optic plate for use in a neutron imaging system, including: disposing a plurality of optical fiber segments side-by-side adjacent to one another in a parallel array; and disposing a binder material between and coupling the plurality of optical fiber segments together. A plurality of first ends of the plurality of optical fiber segments and binder material form a first optical surface. A plurality of second ends of the plurality of optical fiber segments and binder material form a second optical surface opposite the first optical surface. Again, as used herein, "opposite" simply means "at the other end of" one or more optical fiber(s) or optical fiber segment(s). A diffuse reflective material is optically coupled to the plurality of first ends of the plurality of optical fiber segments. An optical detector device is optically coupled to the plurality of second ends of the plurality of optical fiber segments opposite the diffuse reflective material. The method also includes disposing a housing about one or more of the parallel array and the binder material, the diffuse reflective material, and the optical detector device. Optionally, the method further includes disposing a diffuse reflective material one or more of on an exterior surface of each of the plurality of optical fiber segments and between the plurality of optical fiber segments. Each of the plurality of optical fiber segments is derived from one or more elongate optical fibers manufactured using a micro-pulling-down technique. Each of the plurality of optical fiber segments includes one or more of LiInSe2, LiInS2, LiCaF, a neutron absorber loaded glass, polystyrene, polyvinyl toluene, or the like.

In a further exemplary embodiment, the present disclosure provides a neutron imaging system, including: a chalcopyrite, colquiriite, neutron absorber loaded glass, or plastic scintillator based fiber optic plate, including: a plurality of optical fiber segments disposed side-by-side adjacent to one another in a parallel array; and a binder material disposed between and coupling the plurality of optical fiber segments together. The neutron imaging system also includes a diffuse reflective material optically coupled to a plurality of first ends of the plurality of optical fiber segments. The neutron imaging system further includes an optical detector device optically coupled to a plurality of second ends of the plurality of optical fiber segments opposite the diffuse reflective material. Optionally, the neutron imaging system further includes a reflective mirror disposed between the optical detector device and the plurality of second ends of the plurality of optical fiber segments. Optionally, the neutron imaging system further includes a diffuse reflective material disposed one or more of on an exterior surface of each of the plurality of optical fiber segments and between the plurality of optical fiber segments. Each of the plurality of optical fiber segments includes one or more of LiInSe2, LiInS2, LiCaF, a neutron absorber loaded glass, polystyrene, polyvinyl toluene, or the like.

BRIEF DESCRIPTION OF THE DRAWINGS

The present disclosure is illustrated and described herein with reference to the various drawings, in which like reference numbers are used to denote like device components/method steps, as appropriate, and in which.

DETAILED DESCRIPTION OF THE DISCLOSURE

In general, Stowe et al. (U.S. Pat. No. 9,334,581) provide a method for synthesizing I-III-VI2 compounds that may be used in conjunction with the present disclosure, including: (1) melting a Group III element; (2) subsequently adding a Group I element to the melted Group III element at a rate that allows the Group I and Group III elements to react, thereby providing a single phase I-III compound; and (3) subsequently adding a Group VI element to the single phase I-III compound and heating. The Group III element is melted at a temperature of between about 200 degrees C. and about 700 degrees C., for example. One (1) mole of the Group I element is added to one (1) mole of the Group III element. Preferably, the Group I element consists of a neutron absorber, such as 6Li, and the Group III element consists of In or Ga, for example. The Group VI element and the single phase I-III compound are heated to a temperature of between about 700 degrees C. and about 1000 degrees C., for example. Two (2) moles of the Group VI element are added to the single phase I-III compound. Preferably, the Group VI element consists of S, Se, or Te, for example. Optionally, the method also includes doping with a Group IV element activator.

LiInSe2 and the like synthesized and grown by this method and a Bridgman or Czochralski method would require tiling smaller detectors with individual readouts to create a wide area detector, or producing a boule of several inches in diameter for a single crystal, which may be costly to scale up. Vertical columnar growth through vapor deposition would be ideal to mirror CsI(Tl) methods, but the temperatures required could degrade the LiInSe2 or the like into its constituents and/or segregation products, such as InSe3, for example. Thus, the present disclosure utilizes bundles or arrays of packed optical fiber segments, the optical fiber segments coming from optical fibers grown using a µ-PD technique or other standard technique for producing optical fiber, well known to those of ordinary skill in the art.

Figure 1:
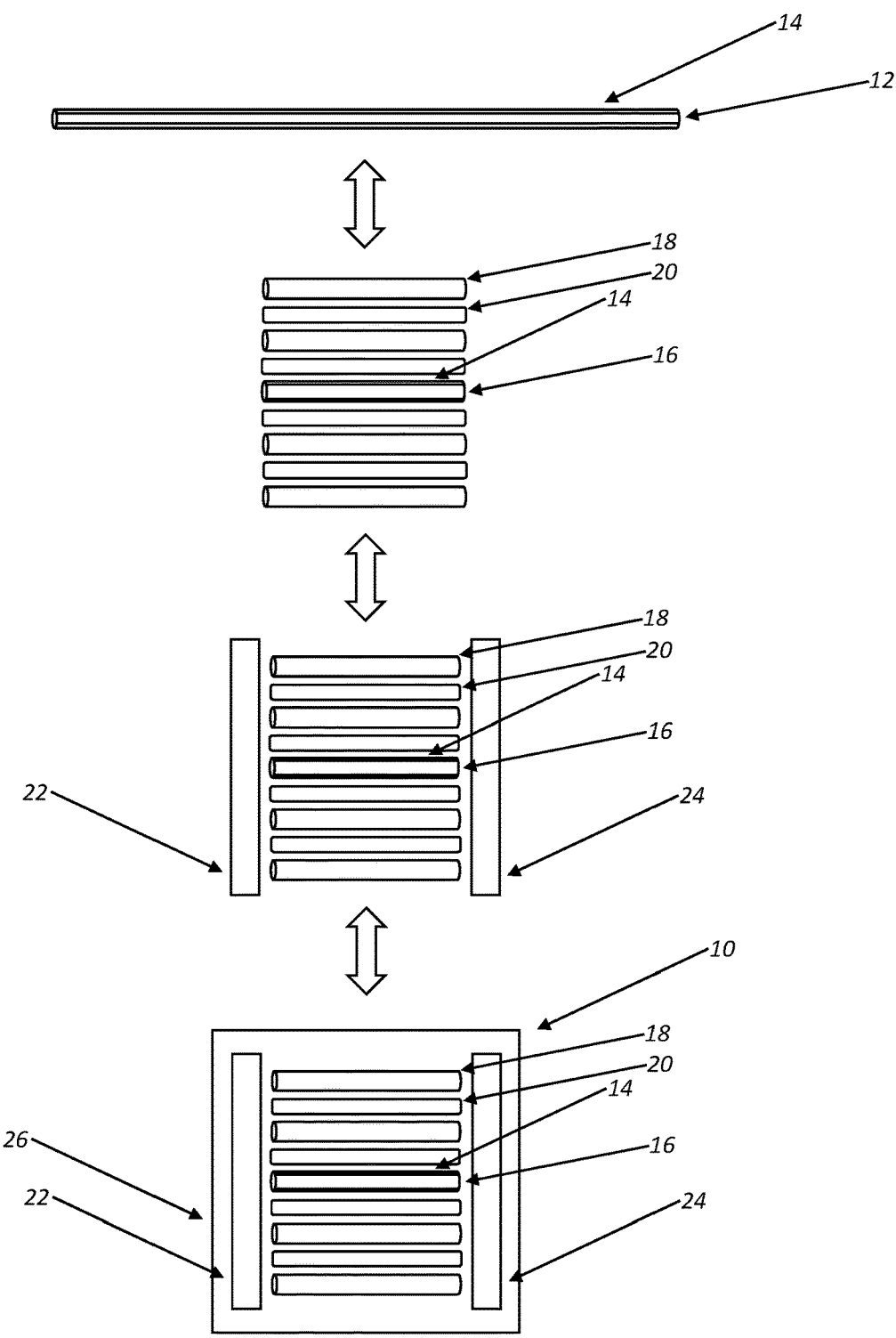
FIG. 1 is a schematic diagram illustrating one exemplary embodiment of the assembly method of the chalcopyrite based FOP of the present disclosure.
Figure 2:
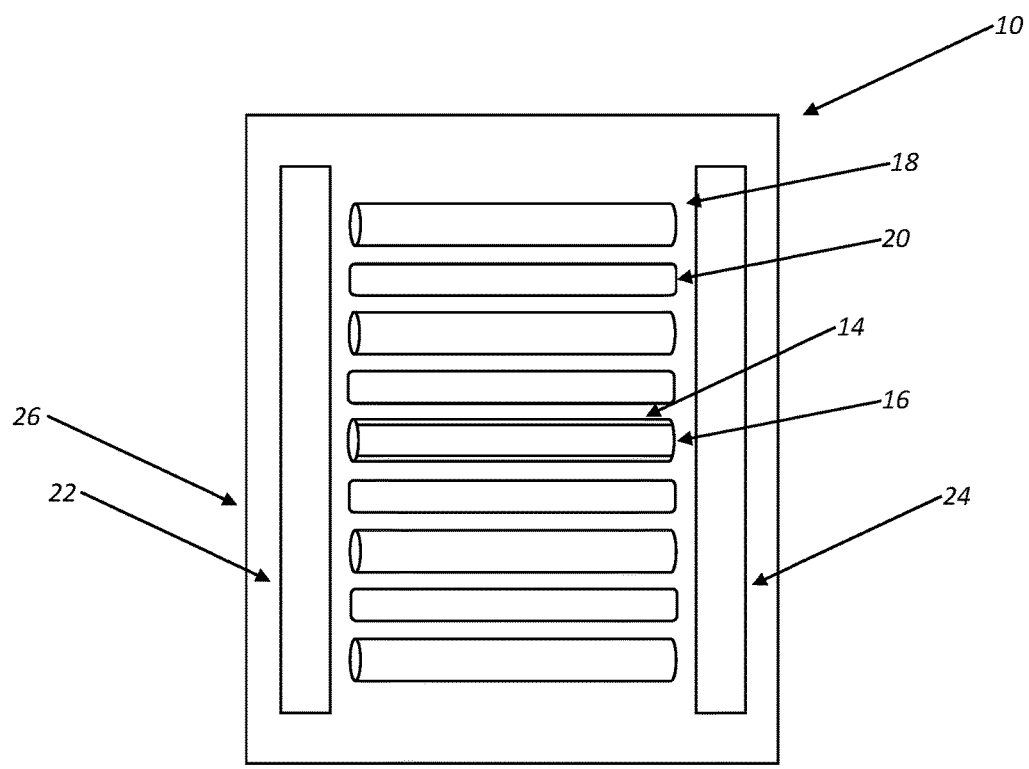
FIG. 2 is a schematic diagram illustrating one exemplary embodiment of the chalcopyrite based FOP of the present disclosure.

Referring now specifically to FIGS. 1 and 2, in one exemplary embodiment, the FOP 10 of the present disclosure is produced in several steps. First, an elongate strand of optical fiber 12 (FIG. 1) manufactured from the chosen chalcopyrite (or colquiriite, neutron absorber loaded glass, or plastic scintillator) material, such as LiInSe2 or the like, is obtained/provided. The optical fiber may have a substantially circular cross-sectional shape or another suitable cross-sectional shape, as desired, with an exterior diameter, thickness, or dimension of between about 0.1 mm and about 5 mm, for example. Optionally, the optical fiber 12 is mechanically and/or chemically polished to smooth the surface to enhance the "waveguide" performance of the optical fiber 12. Optionally, the optical fiber 12 is coated with a diffuse reflector material 14, such as PTFE or the like, that acts as a "cladding" to again enhance the "waveguide" performance of the optical fiber 12. Other suitable diffuse reflector materials 14 include, but are not limited to, TiO2 and sputtered aluminum. Next, the optical fiber 12 is divided into a plurality of short (~5 mm, for example) optical fiber segments 16, which are oriented in a parallel array 18 using a fixture (not illustrated). This parallel array 18 may contain tens to hundreds-of-thousands of optical fiber segments 16. The parallel array 18 extends in two dimensions, and has a depth that is equal to the length of the optical fiber segments 16. On average, the optical fiber segments 16 are separated by between about 0.5 mm and about 6 mm, center-to-center, for example. A binder material 20, such as an epoxy, other adhesive, and/or optional diffuse reflector material, is then disposed between the optical fiber segments 16, pressurized, and cured to form a prismatic structure with minimized volume loss. Suitable binder materials 20 include, but are not limited to, optical adhesives and UV cured epoxies. Any excess chalcopyrite (or colquiriite, neutron absorber loaded glass, or plastic scintillator) material/binder material 20 is then removed from the ends/sides of the parallel array 18 using a conventional cutting/polishing process, well known to those of ordinary skill in the art, such that suitably squared off and smooth optical surfaces are provided. A specular reflector material 22, such as aluminum, 3M Vikuiti, or the like, or diffuse reflector material 22, such as PTFE or the like, is optically coupled to one end face of the parallel array 18. A CCD detector 24 or the like, well known to those of ordinary skill in the art, is optically coupled to the other end face of the parallel array, opposite the reflector material 22. Finally, the resulting assembly is disposed in a light-tight housing 26 for handling and use.

In general, μ-PD is a crystal growth technique that is based on the continuous transport of a melted substance through micro-channel(s) made in a crucible bottom. Continuous solidification of the melted substance is progressed on a liquid/solid interface positioned under the crucible. In a steady state, both the melted substance and the crystal are pulled down with a constant (but generally different) velocity. Many different types of crystals are conventionally grown by this technique, including $Y_3Al_5O_{12}$, Si, SiGe, $LiNbO_3$, $\alpha$-$Al_2O_3$, $Y_2O_3$, $Sc_2O_3$, LiF, $CaF_2$, $BaF_2$, etc.

In general, a CCD is a device for the movement of electrical charge, usually from within the device to an area where the charge can be manipulated, for example converted into a digital value. This is achieved by "shifting" signals between stages within the device one at a time. CCDs move charge between capacitive bins within the device. CCDs are widely used in digital imaging. In a CCD image sensor, pixels are represented by p-doped metal-oxide-semiconductor (MOS) capacitors. These capacitors are biased above a threshold for inversion when image acquisition begins, allowing the conversion of incoming photons into electron charges at the semiconductor-oxide interface; the CCD is then used to read out these charges. Although CCDs are not the only technology to allow for light detection, CCD image sensors are widely used in medical and scientific applications where high quality image data is required. In applications with less exacting quality demands, active pixel sensors (i.e., CMOSs) may also be used. In general, the optical fiber segments 16 of the present disclosure may be aligned with "pixels" of the CCD detector 24 in any desired manner, and advantageously provide sub-100 μm pixel spacing of optical readout.

Figure 3:
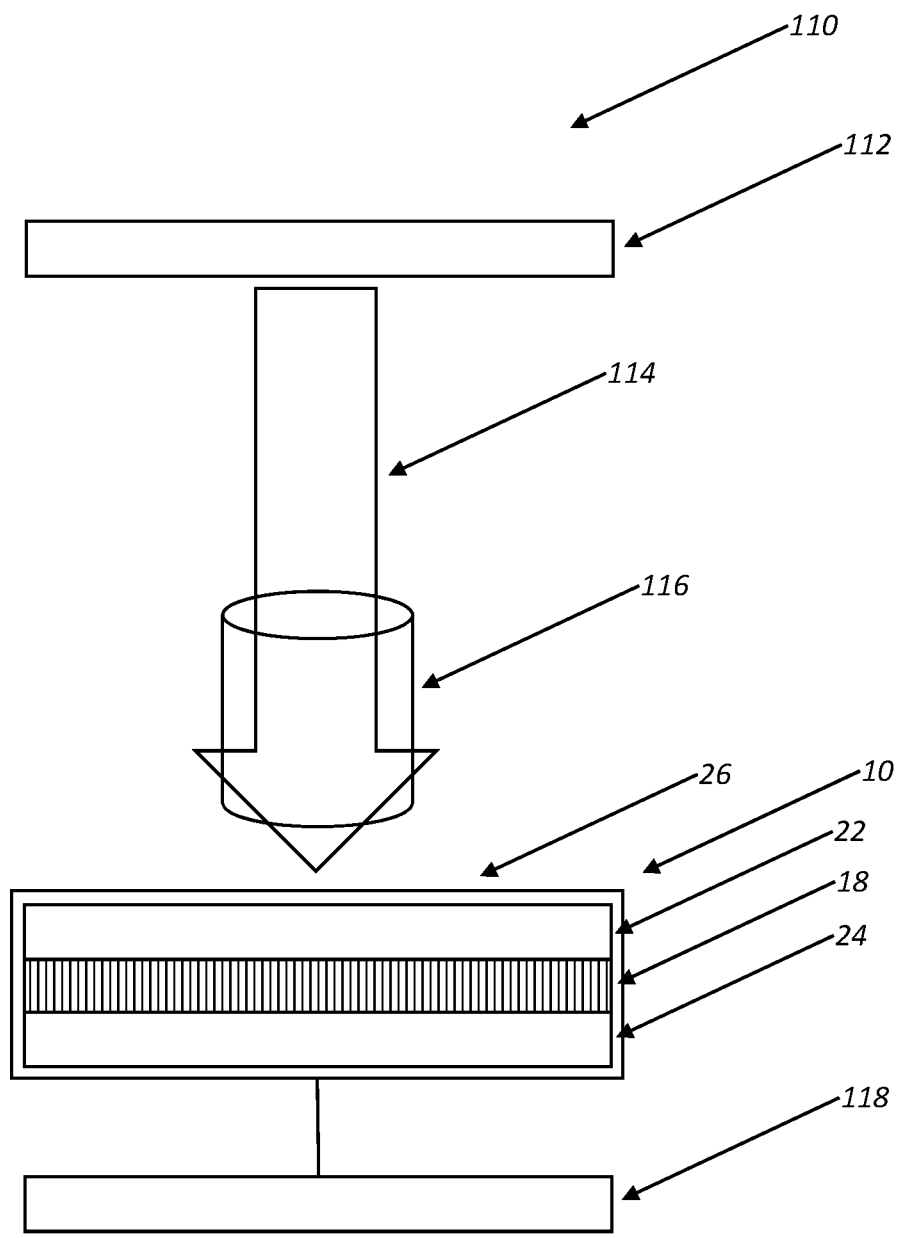
FIG. 3 is a schematic diagram illustrating one exemplary embodiment of a neutron imaging setup incorporating a variant of the chalcopyrite based FOP of the present disclosure.

Referring now specifically to FIG. 3, in one exemplary embodiment, a direct beam neutron imaging system 110 utilizing the FOP 10 of the present disclosure includes a neutron source 112 that is operable for delivering a neutron beam 114 to an object to be imaged 116 that is disposed adjacent to the FOP 10. In this exemplary embodiment, the FOP 10 includes the parallel array 18 described herein above, as well as the diffuse reflector material 22 and the CCD detector or the like 24, all disposed within the housing 26. The CCD detector 24 or the like is then coupled to a processor 118 for analyzing the image data.

Figure 4:
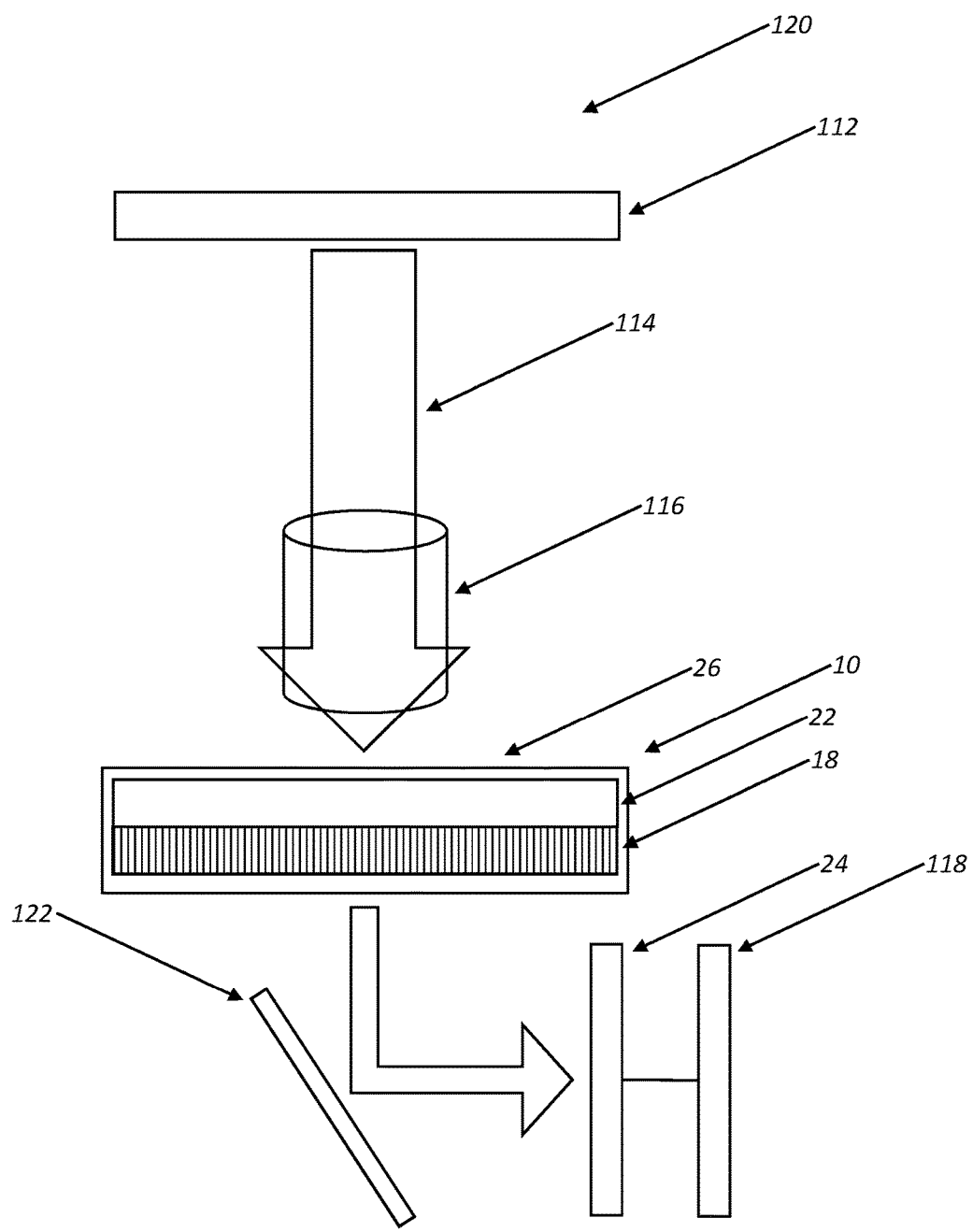
FIG. 4 is a schematic diagram illustrating another exemplary embodiment of a neutron imaging setup incorporating a variant of the chalcopyrite based FOP of the present disclosure.

Referring now specifically to FIG. 4, in another exemplary embodiment, an indirect beam neutron imaging system 120 utilizing the FOP 10 of the present disclosure again includes a neutron source 112 that is operable for delivering a neutron beam 114 to an object to be imaged 116 that is disposed adjacent to the FOP 10. In this exemplary embodiment, the FOP 10 includes the parallel array 18 described herein above, as well as the diffuse reflector material 22, both disposed within the housing 26. The CCD detector or the like 24 and an associated camera are coupled to the parallel array 18 through a reflective mirror 122. The CCD detector 24 or the like and the associated camera are then coupled to a processor 118 for analyzing the image data. The CCD detector 24 or the like, the associated camera, and the mirror 122 may all be disposed within a camera box for ease of use.

Thus, in various exemplary embodiments, the present disclosure provides a chalcopyrite, colquiriite, neutron absorber loaded glass, or plastic scintillator based FOP 10 for neutron imaging applications and the like. $LiInSe_2$ may be used, for example. $LiInSe_2$ is a neutron detecting material that exhibits both semiconductor and scintillator properties. $LiInSe_2$ may be grown using a vertical Bridgman single crystal method or the like, providing a large detector exhibiting charge and/or light sharing properties that result in a low spatial resolution limit. For high resolution neutron imagery, a single crystal scintillator requires either fine pixilation of a directly coupled CCD or SiPM device 24 or a sophisticated set of imaging optics to transmit scintillation light from the single crystal scintillator(s) through a lens to a remote CCD device 24. Semiconducting variants are limited by the fundamentals of photolithography, and more succinctly by the pixel size of the ASIC readout. In either case, $LiInSe_2$ has been demonstrated to provide 50 μm resolution with <2 cm2 of detector area, overcoming the detector spatial area problems inhibiting the creation of a low cost, commercially viable neutron imaging plate. $LiInSe_2$ has also been demonstrated to provide >82% thermal neutron efficiency with 6Li, >1% fast neutron efficiency with 5 mm thickness, fast signal readout (31 ns and 143 ns), superior light output, and selective wavelength transparency. Thus, $LiInSe_2$ may be used in both direct and mirrored imaging setups, utilizing the current state-of-the-art in CCD readouts common to the medical industry, for example.

The $LiInSe_2$ utilized in the present disclosure is grown using a μ-PD technique or other standard technique for producing optical fiber, well known to those of ordinary skill in the art. This produces elongate strands of optical fiber 12 that are then cut and arranged in parallel in a closely packed array 18, with an epoxy adhesive binder 20 or the like disposed between the optical fiber segments 16. The front and back surfaces of the resulting plate 18 are then planed and polished to facilitate coupling to a CCD device 24 and opposed reflector 22, for example. This provides a chalcopyrite imaging detector panel 10 that responds well to both thermal and fast neutrons, depending on the thickness of the imaging detector panel 10. Optionally, each of the optical fiber segments 16 is "cladded" or coated with or otherwise surrounded by a diffuse reflector material 14, such as PTFE, that enhances the "waveguide" behavior of each of the optical fiber segments.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A scintillator based fiber optic plate for use in a neutron imaging system, comprising:
   a plurality of optical fiber segments disposed side-by-side adjacent to one another in a parallel array, wherein each of the plurality of optical fiber segments itself is manufactured from a scintillator core material; and
   a binder material disposed between and coupling the plurality of optical fiber segments together.

2. The fiber optic plate of claim 1, wherein the plurality of optical fiber segments comprise a plurality of chalcopyrite, colquiriite, neutron absorber loaded glass, or plastic scintillator based optical fiber segments.

3. The fiber optic plate of claim 1, wherein a plurality of first ends of the plurality of optical fiber segments and binder material form a first optical surface.

4. The fiber optic plate of claim 3, wherein a plurality of second ends of the plurality of optical fiber segments and binder material form a second optical surface opposite the first optical surface.

5. The fiber optic plate of claim 1, further comprising a diffuse reflective material optically coupled to a plurality of first ends of the plurality of optical fiber segments.

6. The fiber optic plate of claim 5, further comprising an optical detector device optically coupled to a plurality of second ends of the plurality of optical fiber segments opposite the diffuse reflective material.

7. The fiber optic plate of claim 6, further comprising a housing disposed about one or more of the parallel array and the binder material, the diffuse reflective material, and the optical detector device.

8. The fiber optic plate of claim 1, further comprising a diffuse reflective material disposed one or more of on an exterior surface of each of the plurality of optical fiber segments and between the plurality of optical fiber segments.

9. The fiber optic plate of claim 1, wherein each of the plurality of optical fiber segments is derived from one or more elongate optical fibers manufactured using a micro-pulling-down technique.

10. The fiber optic plate of claim 1, wherein each of the plurality of optical fiber segments comprises one or more of $LiInSe_2$, $LiInS_2$, $LiCaF$, a neutron absorber loaded glass, polystyrene, and polyvinyl toluene.

11. A method for manufacturing a scintillator based fiber optic plate for use in a neutron imaging system, comprising:
   disposing a plurality of optical fiber segments side-by-side adjacent to one another in a parallel array, wherein each of the plurality of optical fiber segments itself is manufactured from a scintillator core material; and
   disposing a binder material between and coupling the plurality of optical fiber segments together.

12. The method of claim 11, wherein the plurality of optical fiber segments comprise a plurality of chalcopyrite, colquiriite, neutron absorber loaded glass, or plastic scintillator based optical fiber segments.

13. The method of claim 11, wherein a plurality of first ends of the plurality of optical fiber segments and binder material form a first optical surface.

14. The method of claim 13, wherein a plurality of second ends of the plurality of optical fiber segments and binder material form a second optical surface opposite the first optical surface.

15. The method of claim 11, further comprising optically coupling a diffuse reflective material to a plurality of first ends of the plurality of optical fiber segments.

16. The method of claim 15, further comprising optically coupling an optical detector device to a plurality of second ends of the plurality of optical fiber segments opposite the diffuse reflective material.

17. The method of claim 16, further comprising disposing a housing about one or more of the parallel array and the binder material, the diffuse reflective material, and the optical detector device.

18. The method of claim 11, further comprising disposing a diffuse reflective material one or more of on an exterior surface of each of the plurality of optical fiber segments and between the plurality of optical fiber segments.

19. The method of claim 11, wherein each of the plurality of optical fiber segments is derived from one or more elongate optical fibers manufactured using a micro-pulling-down technique.

20. The method of claim 11, wherein each of the plurality of optical fiber segments comprises one or more of $LiInSe_2$, $LiInS_2$, $LiCaF$, a neutron absorber loaded glass, polystyrene, and polyvinyl toluene.

21. A neutron imaging system, comprising:
   a scintillator based fiber optic plate, comprising:
      a plurality of optical fiber segments disposed side-by-side adjacent to one another in a parallel array, wherein each of the plurality of optical fiber segments itself is manufactured from a scintillator core material; and
      a binder material disposed between and coupling the plurality of optical fiber segments together.

22. The neutron imaging system of claim 21, wherein the plurality of optical fiber segments comprise a plurality of chalcopyrite, colquiriite, neutron absorber loaded glass, or plastic scintillator based optical fiber segments.

23. The neutron imaging system of claim 21, further comprising a diffuse reflective material optically coupled to a plurality of first ends of the plurality of optical fiber segments.

24. The neutron imaging system of claim 23, further comprising an optical detector device optically coupled to a plurality of second ends of the plurality of optical fiber segments opposite the diffuse reflective material.

25. The neutron imaging system of claim 24, further comprising a reflective mirror disposed between the optical detector device and the plurality of second ends of the plurality of optical fiber segments.

26. The neutron imaging system of claim 21, further comprising a diffuse reflective material disposed one or more of on an exterior surface of each of the plurality of optical fiber segments and between the plurality of optical fiber segments.

27. The neutron imaging system of claim 21, wherein each of the plurality of optical fiber segments comprises one or more of $LiInSe_2$, $LiInS_2$, $LiCaF$, a neutron absorber loaded glass, polystyrene, and polyvinyl toluene.

* * * * *